United States Patent
Ji

(10) Patent No.: US 7,672,551 B2
(45) Date of Patent: Mar. 2, 2010

(54) CONFIGURATIONS AND METHODS FOR MANUFACTURING OPTICAL DEVICES USING AN ATHERMAL PLATFORM

(75) Inventor: Guijun Ji, Cupertino, CA (US)

(73) Assignee: Oplink Communications, Inc., Fremont, CA (US)

( * ) Notice: Subject to any disclaimer, the term of this patent is extended or adjusted under 35 U.S.C. 154(b) by 116 days.

(21) Appl. No.: 11/056,016

(22) Filed: Feb. 11, 2005

(65) Prior Publication Data

US 2006/0182390 A1   Aug. 17, 2006

(51) Int. Cl.
G02B 6/00 (2006.01)
G02B 6/10 (2006.01)
G02B 6/26 (2006.01)
G02B 6/32 (2006.01)
G02B 6/42 (2006.01)
G02B 6/255 (2006.01)
C03B 37/00 (2006.01)
C03B 37/023 (2006.01)
C03B 37/15 (2006.01)

(52) U.S. Cl. ............... 385/33; 385/31; 385/34; 385/39; 385/47; 385/50; 264/1.24; 264/1.25; 264/1.26; 65/385; 65/387; 65/406

(58) Field of Classification Search ............ 385/33, 385/31, 34, 39, 47, 50; 264/1.24, 1.25, 1.26; 65/385, 387, 406
See application file for complete search history.

(56) References Cited

U.S. PATENT DOCUMENTS 7,171,073 B1   1/2007   Wu et al.

2004/0086226 A1 *   5/2004   Hellman et al. ............ 385/33
2006/0067614 A1    3/2006   Wang
2006/0182390 A1    8/2006   Ji

FOREIGN PATENT DOCUMENTS

CN   1427557 A   7/2003
CN   2706966 Y   6/2005

OTHER PUBLICATIONS

International Search Report and Written Opinion from International Application No. PCT/CN2008/000024 mailed Sep. 25, 2008, 13 pages.

* cited by examiner

*Primary Examiner*—Frank G Font
*Assistant Examiner*—Jerry Blevins
(74) *Attorney, Agent, or Firm*—Fish & Richardson P.C.

(57) ABSTRACT

The present invention discloses an improved optical device having at least a first and second optical components. The optical device further includes a first extending tube securely attached to the first and second optical components as a first building block wherein the first and second optical components are aligned and position adjusted in the position-holding-and-fixing means and securely attached thereto by a room-temperature UV curable epoxy UV cured at room temperature. The optical device then further assembled using a step-by-step building block assembling process with more building blocks assembled by optical components similar to the first building block described above. In other preferred embodiment, the first and second optical components held in the extending tube having a pre-aligned dihedral angle between the first and second optical components.

21 Claims, 4 Drawing Sheets

Angle Clocking and XYZ Displacement of Input/output-block

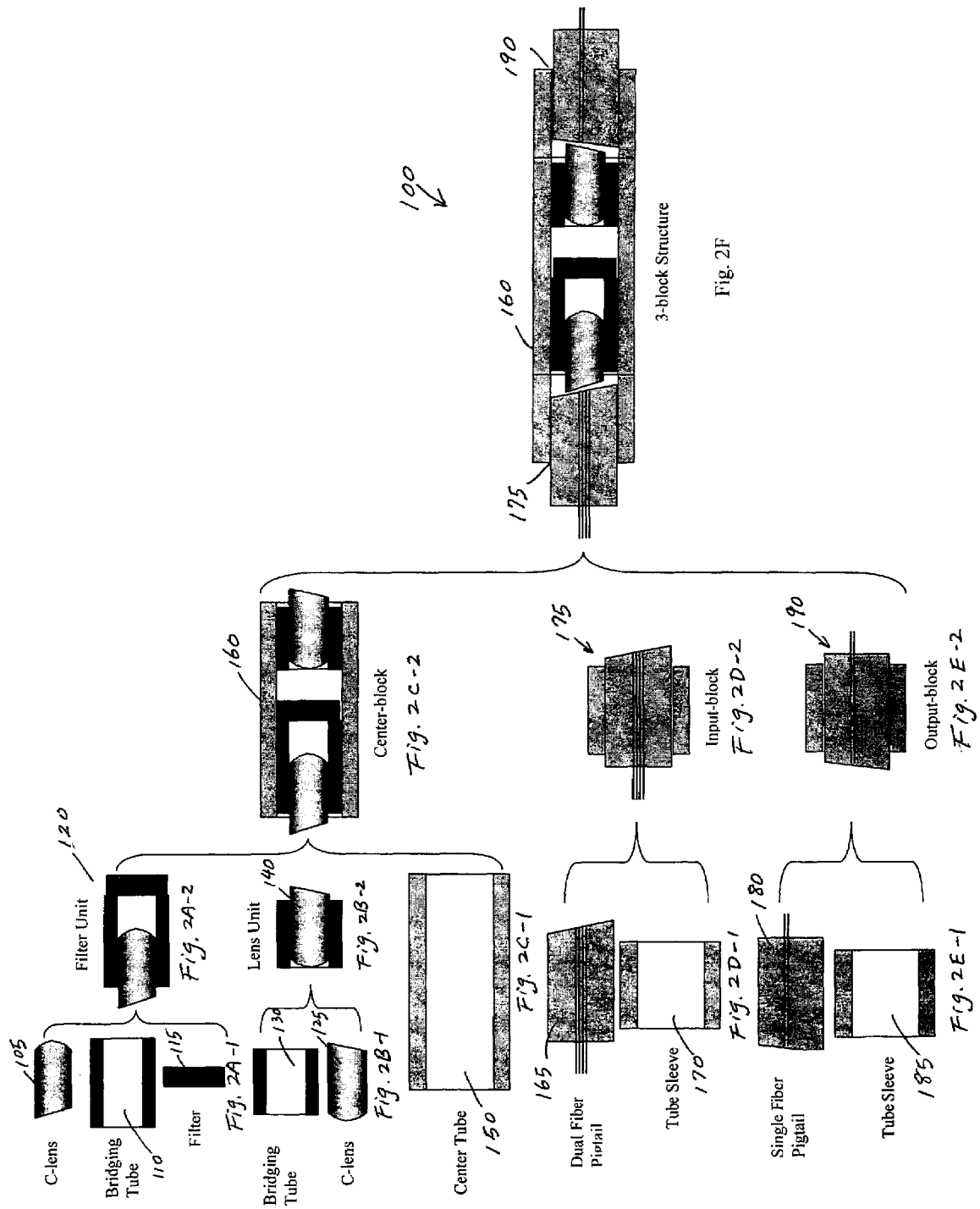

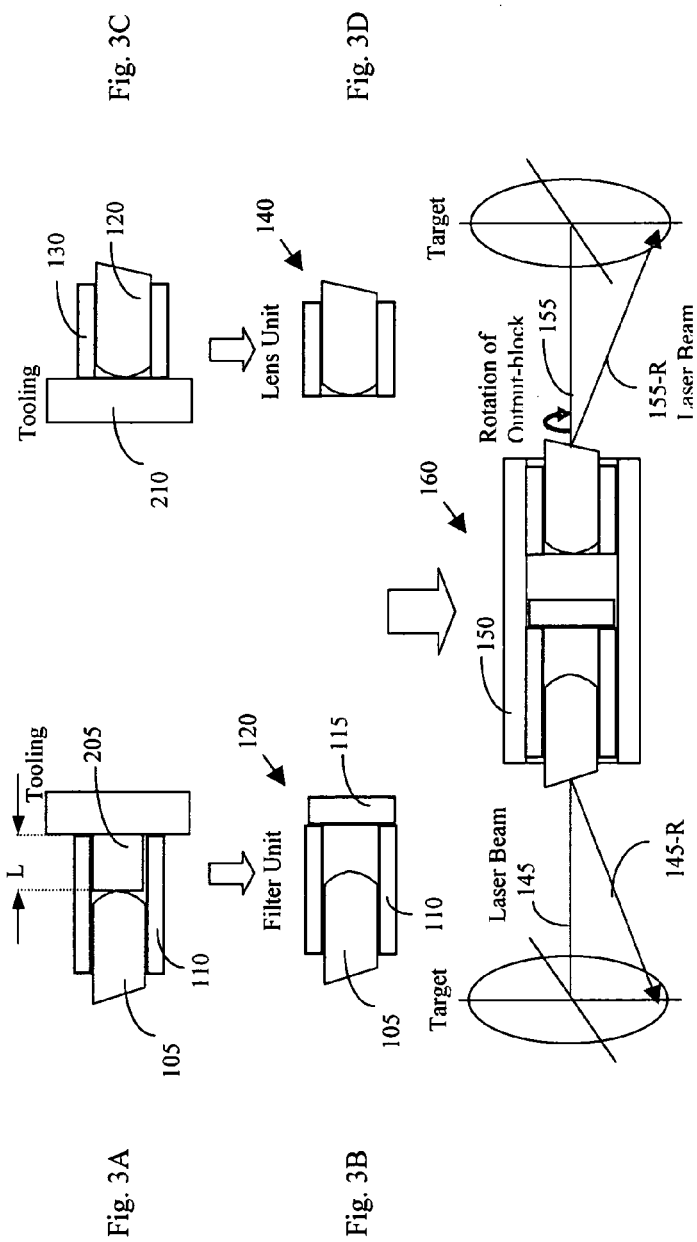
Fig. 3A
Fig. 3B
Fig. 3C
Fig. 3D
Fig. 3E Block Assembly Schematic with Specific Tool
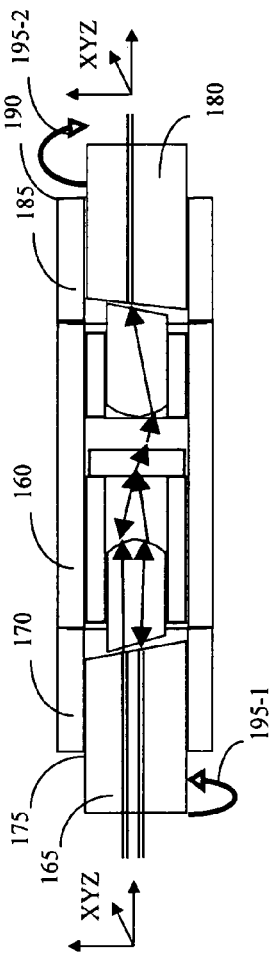
Fig. 4 Angle Clocking and XYZ Displacement of Input/output-block

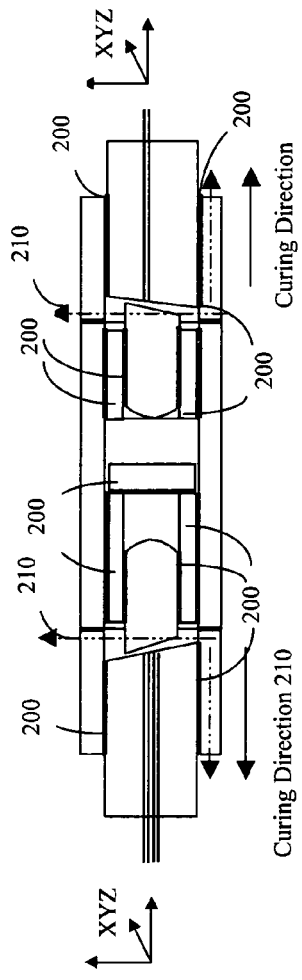
Fig. 5 Epoxy Wicking Layout and Curing Direction
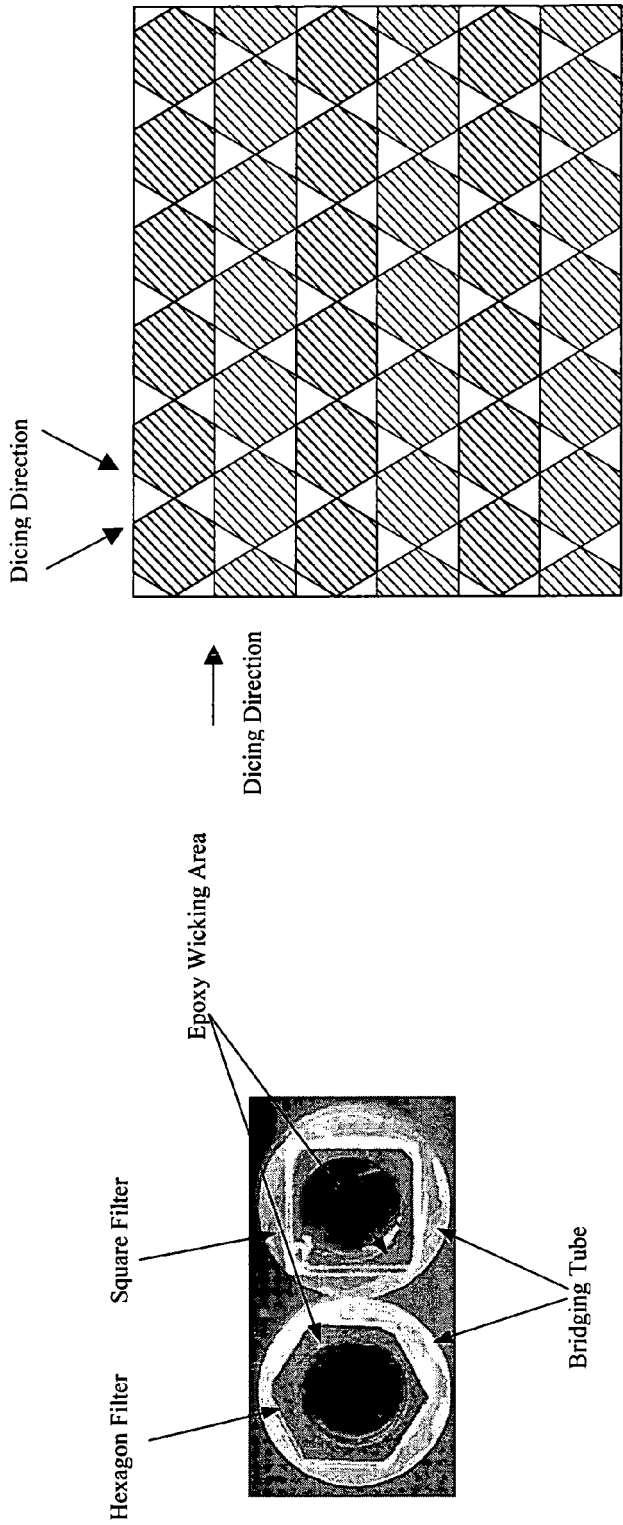
Fig. 7 Hexagon Shape Filter Dicing Schematic
Fig. 6 Hexagon vs. Square Shape Filter

CONFIGURATIONS AND METHODS FOR MANUFACTURING OPTICAL DEVICES USING AN ATHERMAL PLATFORM

FIELD OF THE INVENTION

This invention relates generally to a configurations and methods for manufacturing optical device employed in optical fiber technology. More particularly, this invention relates to the configurations, materials and methods used in manufacturing optical device by applying a new and improved athermal platform for optical device (APOD) technology.

BACKGROUND OF THE INVENTION

Those of ordinary skill in the art of designing and manufacturing optical devices for application in optical fiber signal transmissions are encountered with a common technical limitation that most of the passive optical devices are built by applying a thermal process with an elevated temperature that often causes a degradation of optical performance at room temperature. Techniques of thermal process (soldering, laser welding and heat-curing epoxy) are applied where the optical device is aligned, optimized, cured and packaged under an elevated temperature of more than 100° C. Furthermore, the optical devices manufactured by thermal process usually have a non-symmetric optical performance, loose distribution and poor thermal stability.

The performance and reliability of the optical devices depend heavily on their design and packaging technologies. Currently, two major kinds of design and packaging technologies, e.g., soldering based and laser-welding based technologies, are widely employed in manufacturing the passive optical devices and each of these technologies has advantages and disadvantages. The laser-welding based technology generally involves more complicated, time consuming processes and expensive equipments thus increases the production costs and limits the manufacturability. The soldering based technology is more flexible and low cost, but it is highly operator skill dependent. Device made by soldering process has poor optical performance and bad thermal stability. Furthermore, soldering and laser-welding process are usually heated up to a higher temperature at certain soldering/welding points and may adversely affect the alignment and device performance due to heat-adjustment/laser hammering process. Recently a heat-curing epoxy based technology for designing and packaging the WDM couplers is emerging, the optical components are bonded together by heat-curing epoxy. The optical devices bonded together with heat-curing epoxy usually present potential performance and reliability risk due to heat-curing process for alignment, optimization and packaging, which leads a degradation and uniformity of optical performance at room temperature.

Conventional techniques of manufacturing optical devices are further limited by other difficulties in that when several subassemblies are assembled into one device, the relative dihedral angle between optical surfaces of subassembly is random and difficult to control. The difficulties arise from the fact the assembling process involves linear alignment and angular adjustments of each subassembly in order to optimize the optical performance of device. When there are multiple parameters for adjustments and some of these parameters are functionally mutual-dependent, the processes of alignment and performance optimization become too complicate and comprises must be made to sacrifice one or several functional performance characteristics in order to manufacture the optical device within limited period of time and under a certain amount of production cost. The difficulties of performance optimization during the final assembling process are further compounded by the problems caused by the thermal effect that often takes place after the optimization process is completed and thus the efforts spent in fine-tuning the optical device are again distorted and altered when a high temperature is applied for bonding together several subassemblies by either soldering, laser-welding or heat-curing epoxy.

Therefore, a need still exists in the art of design and manufacturing of the optical devices to provide new material compositions, device structure, and manufacturing processes to overcome the difficulties discussed above. Specifically, a technique to provide the optical devices manufactured with improved structural configuration without subject the optical devices to thermal effect is required. It is further desirable that a common structural configuration and process can be applied as standard platform wherein standard process and configuration can be adapted for manufacturing a wide variety of optical devices such that the processes can be simplified and the production costs can be reduced.

SUMMARY OF THE PRESENT INVENTION

It is therefore an object of the present invention to provide a new design and process for fabricating an optical device on improved athermal platform using room-temperature UV curable epoxy for securely attaching aligned and relative-position adjusted optical components such that the aforementioned difficulties and limitations in the prior art can be significantly improved.

Specifically, it is an object of the present invention to provide a step-by-step building block assembling process to systematically assemble an optical device by employing a components extending tube such that the manufacturing processes are simplified. The variations of components alignment, relative position adjustments and dihedral angle between two optical surfaces can be managed with high accuracy. In a specific embodiment, the simplified processes are arranged such that the final assembling process would only require linear displacement.

Briefly, in a preferred embodiment, the present invention discloses a method for fabricating an optical device having at least two optical components utilizing an athermal platform. The method includes a step of aligning and adjusting a relative position between the two optical components by using a position-holding-and-fixing means and securely fixing the two optical components to the position-holding-and-fixing means as a first building block by applying a UV curable epoxy UV cured at room temperature. In a preferred embodiment, the step of aligning and adjusting a relative position between the two optical components using a position-holding-and-fixing means further includes a step of using an extending tube to hold the optical components and then aligning and adjusting a relative position between the two optical components held in the extending tube. In another preferred embodiment, the step of using an extending tube to hold the optical components and then aligning and adjusting a relative position between the two optical components held in the extending tube further includes a step of aligning dihedral angle between optical surfaces of two optical components.

The present invention further discloses an optical device having at least a first and second optical components. The optical device further includes a first position-holding-and-fixing means securely attached to the first and second optical components as a first building block wherein the first and second optical components are aligned and position adjusted in the position-holding-and-fixing means and securely attached thereto by a UV curable epoxy UV cured at room temperature. The optical device is then further assembled using a step-by-step building block assembling process with more building blocks assembled by optical components similar to the first building block described above. In other preferred embodiment, the first position-holding-and-fixing means further includes an extending tube to hold the first and second optical components.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIGS. 2A-1 to 2F are cross sectional views for illustrating a step-by-step building block buildup process for manufacturing optical devices based on an athermal platform of this invention;

FIG. 3A to 3E are cross sectional views for illustrating the application of manufacturing tools for the step-by-step building block assembling process of FIG. 2;

FIG. 4 is a cross sectional view for showing the adjustment of linear displacement when performing a final alignment of the optical device;

FIG. 5 is cross sectional view showing the controlled wicking process of the bonding medium in the small gaps between optical components and the extending tubes;

FIG. 6 show a comparison between a hexagonal versus a square shape filter for illustrating the difference between the contacting areas useful for securely holding the filter in the optical device.

FIG. 7 shows a hexagon shape filter dicing schematic.

DETAILED DESCRIPTION OF THE PREFERRED EMBODIMENT

Figure 1:
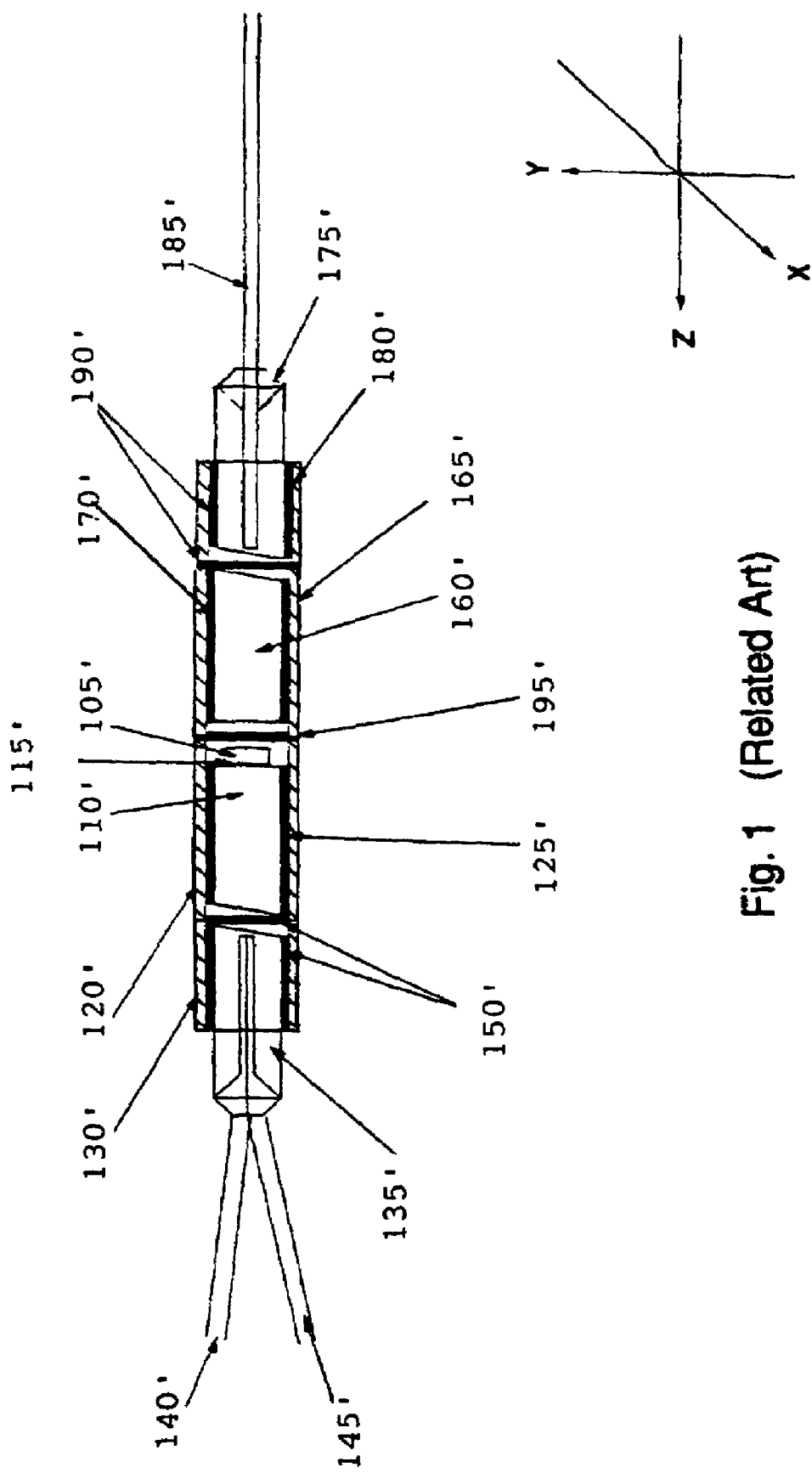
FIG. 1 is a cross sectional view of an optical device, e.g., a wavelength division multiplex (WDM) device disclosed by a prior art patent.

The present invention discloses an athermal platform for manufacturing optical device that includes several major building blocks and each building block further includes several optical components. On the basis of the athermal platform, each building block is built through a step-by-step "building block" process wherein every two optical components are affixed together via a position-holding-and-fixing means such as an extending tube. The step-by-step building block process includes a step of employing the position-holding-and-fixing means for aligning and arranging a relative position between two optical components followed by bonding and fixing these two components integrated with the position-holding-and-fixing means as optical building block using a UV curable epoxy UV cured at room temperature. The sep-by-step building block process then continues with affixing and bonding the optical building block with another optical building block again using the UV curable epoxy UV cured at room temperature. In a preferred embodiment, the optical device includes three building blocks wherein each building block includes several optical components and the optical components are bonded together by applying a new and improved epoxy while the epoxies employed for bonding are prevented from spreading over the optical paths between the optical components such as lenses, filters and the fiber pigtails.

Please refer to FIGS. 2A-1 to 2F for discussion of the materials and the fabrication processes employed to manufacture an optical device 100 using a step-by-step building block assembling process of this invention. As shown in FIGS. 2A-1 and 2A-2 a first C-lens 105 and a filter 115 is first assembled with a first extending tube 110 into a filter-unit 120 by applying a special tool as will be further discussed below in FIG. 3A and FIG. 3B. The first C-lens 105, the first extending tube 110 and the filter 115 are assembled and fixed together by a special athermal process applying a UV curable epoxy through a controlled epoxy wicking process, to be further discussed below in FIG. 4, filling the gaps between the first C-lens 105 and the first extending tube 110 and the gap between the filter 115 and the end surface of the first extending tube 110. The epoxy is UV cured at room temperature and the filter-unit 120 is securely assembled and the optical components are fixed in position without concerns of relative position shifts or movements. By applying a similar process, as shown in FIGS. 2B-1 and 2B-2, a second C-lens 125 is attached to an extending tube 130 to assemble into a lens-unit 140 fixing and attaching securely with UV curable epoxy cured at room temperature. By applying the step-by-step building block assembling process, as that shown in FIGS. 2C-1 and 2C-2, the filter-unit 120 and the lens-unit are inserted into a bridging tube 150 to assemble into a center-block 160.

The details of alignment, relative distance adjustment between the filter-unit 120 and the lens-unit 140 and a dihedral angle between optical end-faces of filter-unit and lens-unit are further explained below. After theses position optimization processes are completed, an athermal process is applied to the center-block to securely and reliably bond the filter-unit 120, the lens-unit 140 to the bridging tube 150. Because the UV curable epoxy is UV cured at room temperature, the relative positions of the filter-unit 120 and lens-units 160 held in the bridging tube 150 are not changed or affected during epoxy curing.

As shown in FIGS. 2D-1 to 2D-2 the step-by-step building block assembling process can be applied in parallel, again, inserting dual fiber pigtail 165 in the extending tube 170 as an input-block 175. In FIGS. 2E-1 to 2E-2 the step-by-step building block assembling process can be applied in parallel, again, inserting the single fiber pigtail 180 in the extending tube 185 as an output-block 190. In FIG. 2F, the step-by-step building block assembling process continues by assembling the input-block 175, the center-block 160 and the output-block 190 into an optical device 100 with a three building block structure. Similarly, an athermal process is applied using the UV curable epoxy UV cured at room temperature for bonding these three building blocks together without a severe thermal effect that may distort or even ruin the optimal positions between these optical building blocks as that may occur when high temperature curing processes for heat-curing epoxy are applied.

Referring now to FIGS. 3A to 3E for the processes of using tools to carry out position adjustments to form the center-block 160. In FIG. 3A, a C-lens tooling 205 that has a fixed length L inserting into the extending tube 110 is used to fix the position of the C-lens 105 relative to the end surface of the extending tube for attaching the filter 115 thereon. Right after the C-lens is placed at its right position inside the first extending tube 110, a room-temperature UV curable epoxy is applied to secure fix the C-lens 105 inside the tube 110 at a fixed position. Then the filter 115 is fixed to the end surface of the tube and securely attached to the tube 110 by the room-temperature UV curable epoxy as that shown in FIG. 3B. Similarly, a second C-lens tooling 210 is used as shown in FIG. 3C to fix a position of the second C-lens 120 inside the second extending tube 120 such that the front end of the C-lens 120 is aligned with the front end surface of the second extending tube 130. Then the second C-lens is securely bonded to the second extending tube 130 by applying the room-temperature UV curable epoxy so that the lens-unit 140 is now securely bonded to function and configurable as an integrated unit.

Referring to FIG. 3E for the processes carried out to assemble the center-block 160 according to the step-by-step building block assembling process. After the filter-unit 120 and the lens-unit 140 are inserted into the bridging tube 150, a distance between these two units is determined by a C-lens holding tools. Then a adjustment of the dihedral angle between angled facet of C-lens of filter and lens unit is performed using two pointing lasers projecting two incident laser beams 145 and 155 onto two facets of the first and second C-lens, respectively. Two reflected beams 145-R and 155-R are generated from two facets of the first and second C-lens. The filter-unit 120 and the lens-unit 140 are rotated based on the angle between the reflected beams 145-R and 155-R to obtain a pre-determined dihedral angle between the facets of two C-lenses. The optimal dihedral angle is calculated with a set of optimal values to compensate the walk-off deviations. A predetermined dihedral angle is employed to tune the dihedral angle between the facets of the first and the second C-lenses by rotating the filter-unit and lens-unit and then the center-block 150 is assembled and securely bonded together by applying the room-temperature UV curable epoxy as that shown in FIG. 3C.

The step-by-step building block assembling processes continue by placing the center-block 150 and also the input-block 175 and output-blocks 190 on an optical alignment bench with the center-block fixed. The input and output-blocks are then oriented on the optical bench with preset dihedral angle relative to center block according to a simulation analysis for optimal optical performance as represented by the dihedral angle 195-1 and 195-2, respectively. Then the input and output-blocks 175 and 190 with the preset dihedral angles 195-1 and 195-2 are placed onto the optical bench immediately next to the center-block 160 as shown in FIG. 4. The final alignment of the optical device is performed now with only linear displacements along the X-Y-Z directions without requiring angular adjustments that are already taken into account and completed in the prior processing steps. Therefore, an optimal optical performance can be more conveniently achieved by simply linearly moving the input and output-blocks relative to the center-block to obtain a minimum coupling loss. The final alignment process as now described can be more conveniently carried out by an automated process which can be a computer-controlled process thus greatly reduces human errors and can achieve time and cost savings.

Referring to FIG. 5 for specific details of the controlled wicking processes of the epoxy 200 along the small gaps between the tubes and the optical components and the directions of UV curing shown as arrows 210. The present invention takes advantage of the controlled epoxy wicking effect under room temperature as a key technology to build the athermal building block assembling platform as shown in the preferred embodiment and disclosed in the three building block structure described above. In order to eliminate cascaded error and to ensure an optimized gap between zero to thirty microns (0~30 μm), the materials, the gap and extending tube dimensions and the tolerance between the inner diameter and the outer diameter and the length are pre-allocated for optimal performance of the controlled epoxy wicking process. Specifically, for an controlled epoxy wicking process, the gaps between the inner diameter and the outer diameter, tube chamfering are designed for guiding the controlled epoxy wicking effect in the gap areas and for preventing the epoxy from leaking into other unwanted surfaces when the epoxy is applied to the interfacing surfaces. The butt joint gaps between input/output-blocks and center-block are guaranteed by perpendicularity of tube end-faces, fixture accuracy and calibration method of fixture. The controlled epoxy wicking effect taking place in the designated gaps as shown in FIG. 5 can automatically adjust and symmetrically arrange the component positions and in the meantime develop uniform epoxy thickness as the epoxy spread out while undergoing the controlled wicking process. The cascaded-tube structure of center-block can also prevent epoxy leakage from butt joint to C-lenses and pigtails according to a controlled epoxy wicking layout based on the predetermined epoxy process and layout designs shown in FIG. 5.

For the athermal platform, in a preferred embodiment, the epoxy is a cationically UV cured epoxy resin developed especially for the joining of fiber optics, which contains a thermal curing mechanism allowing the material to respond to UV and thermal exposure. The epoxy has a high Tg, very good humidity and chemical resistance. Its viscosity is 900 to 1000 cps with 100% solids and hardness D 88. The epoxy responds to UV light in the range of 325 to 380 nm, exposure time is determined by the UV intensity and UV light wavelength range.

According to above descriptions, the athermal platform for optical device (APOD) manufacture process is based on a novel athermal process. On this APOD platform, the optical device is aligned, optimized, cured and packaged under room temperature. The device built on this platform has a symmetric optical performance with super thermal stability and tight distribution. The WDM device 100 as one exemplary preferred embodiment described above had the following specific features:

1. The WDM design for the specific embodiment described above is based on a simple 3-building block (input/output/center-block) structure with step-by-step building block assembly process as shown in FIG. 2A-1 to FIG. 2F. The input-block 175 has a dual fiber pigtail and extending tube. The output-block 190 comprises a single fiber pigtail and extending tube. The center-block 160 comprises a filter-unit 120 (c-lens, filter and extending tube), lens-unit 140 (c-lens and spacer) and bridging tube 150. To passively assemble building block as shown, the process of this invention applies a room-temperature UV curable epoxy with specific tool and fixture as shown in FIG. 3. During the step-by-step building block assembly processes, it is not required to actively monitor the coupling losses. The passive assembling processes greatly reduce the time and efforts required for assembling the optical device.

2. The center-block 160 is a key assembly, which has a specific dihedral angle between two lens facets of filter-unit 120 and lens-unit 140. The dihedral angle between two lens facets is calculated to compensate walk-off caused by filter, non-telecentric optical system, components tolerance and unit/building block assembly error. The center-block is "actively" aligned on a fixture with pointing lasers and rotation targets to control the dihedral angle as shown in FIG. 3E. As shown in FIG. 3E, the C-lens is held and rotated by a small tool or clamp. Two pointing lasers project two laser beams onto the facets of C-lens. The laser beams are reflected onto targets with angle scale. When rotating C-lens the reflected beams on the targets are rotated synchronously. So by monitoring the reflected beams on the target with angle scale the dihedral angle between two C-lens facets can be set to any designed value 3. FIG. 4 shows that the center-block 160 with cascaded tube structure and protruding C-lenses 105 and 125 provides clearance to perform XYZ 3-axis displacement of pigtails of input/output-blocks 170 and 190 respectively, more room between two lenses for additional optical components, and availability to use standardized optical components like capillary, filter and lens. With the protruding C-lens, it is much more convenient to accurately assemble the center block with precise angular adjustment. With cascaded tube structure, a bridging tube with larger inner diameter for center-block can be used. A larger bridging tube provide further flexibilities because it provides more room between two C-lenses to fit a for filter or other optical components of bigger size.

4. Dihedral angle between two optical surfaces is a main thrust of this invention as shown in this exemplary three-building block structure. Except dihedral angle between two lens facets of center-block, the dihedral angles between pigtails facets of input/output-blocks 170 and 190 respectively and lens facets of center-block 160 are also preset on a fixture before final alignment as shown in FIG. 4. The dihedral angles between pigtail facets and center-block are simulated to compensate coupling loss from dual fiber pigtail of input-block to single fiber pigtail of output-block as shown in FIG. 4 where the dihedral angle is adjusted to be within a predefined range to accomplish an optimal performance.

5. With pre-assembled 3-building block structure and preset dihedral angles only XYZ 3-dimensional displacement is required for coupling loss alignment of dual fiber pigtail of input-block itself and coupling loss alignment of input-block to output-block. The XYZ alignment mechanism is based on the object-image relation of an optical system, input-block as object, output-block as image and center-block as the black-box optical system. This XYZ alignment mechanism makes automation alignment with commercial XYZ linear stage, actuator and simple algorithm more practical, simple and fast.

6. Controlled epoxy cold wicking effect is another key technology disclosed in this invention according to the three-building block structure assembly and subassembly process. The materials, dimensions and tolerances (inner diameter, outer diameter and length) are pre-allocated to eliminate cascaded error and ensure an optimized gap between the interfacing surfaces. The "open" epoxy wicking layout as shown in FIG. 5 is determined by the optimized gap and chamfer, which can guide controlled epoxy wicking effect into designed gap area and prevent epoxy leakage to unwanted surfaces when applying epoxy. The butt joint gaps between input/output-block and center-block are guaranteed by perpendicularity of tube end-faces, fixture accuracy and calibration method of fixture. The cold wicking effect is controlled by the tube chamfer and an optimized gap between the cascaded tubes, C-lens. The optimized gap tolerance is designed within 0-30 micrometer and the tube inner/outside chamfer within 20 micrometer 7. Controlled epoxy wicking effect in the designed gap can automatically adjust and symmetrically arrange the component positions to develop uniform epoxy thickness between the interfacing surfaces. The cascaded-tube structure of center-block can also prevent epoxy leakage from butt joint to C-lenses and pigtails as shown in FIG. 5.

8. By the use of the athermal platform, the 3-building block structure device is aligned, optimized and cured under room temperature. Device built on athermal platform has more symmetric optical performance and more stable temperature dependence than device built with heating-curing epoxy. The usage of low viscosity and humidity resistance UV epoxy makes controlled epoxy cold wicking and athermal packaging possible.

9. In order to have better thermal stability glass tube and pigtail are designed to have matched coefficient of thermal extension (CTE) with lens and filter. The designed "open" epoxy layout shown in FIG. 5 also has contributions to thermal stability. The matched CTE implemented in this invention is to control the difference of CTE within plus/minus 2 ppm/° C. An open epoxy layout as shown in FIG. 5 is implemented to assure that the epoxy is not interconnected so that the thermal expansion of epoxy loop is independent and can compensate each other a little bit.

10. Cleaning and glass silane treatment are applied to tube, lens, filter and pigtail in order to turn mechanical bonding of the epoxy into chemical bonding between glasses. With silane treatment the mechanical (adhesive) bonding between glass and epoxy can be turned into molecular bonding due to chemical reaction of epoxy and glass after silane treatment.

11. As shown in FIG. 6, a hexagon shape filter may be employed as an optional design. Compared to the conventional square shaped filter, the hexagon shaped filter provide mores contact area between the end-faces of the filter and the extending tube and more room between the filter corner and the bridging tube to prevent the filter corner touching bridging tube. FIG. 6 shows that the dicing process to produce the hexagon shaped filter, i.e., three dicing directions with the relative spreading angle of 60° between these dicing directions, is similar to the dicing process for producing the square shaped filter i.e., two dicing directions with the relative spreading angle of 90° between these two dicing directions.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A method for fabricating an optical device having at least a first and a second optical component group using an athermal platform comprising:

aligning and adjusting a relative position between two optical component groups using a position-holding-and-fixing means, where a first component group includes one or more optical components positioned substantially within a first extension tube, the one or more optical components being coupled to an interior surface of the first extension tube, and securely fixing the two optical component groups within the position-holding-and-fixing means including fixing the first component group within a second extension tube as a first building block, where aligning the relative position between two optical component groups using the position holding-and-fixing means includes aligning a dihedral angle between the two optical component groups including rotating at least one of the optical component groups relative to the other optical component group.

2. The method of claim 1 wherein:
aligning and adjusting the relative position between the two optical component groups using the position-holding-and-fixing means further includes using the second extension tube to hold the two optical component groups and then aligning and adjusting a relative position between the two optical component groups held in the second extension tube.

3. The method of claim 1 wherein: fixing the first component group includes applying a room temperature UV curable epoxy and UV curing the epoxy at room temperature.

4. The method of claim 1 further comprising:
forming a second building block, including:
aligning and adjusting a relative position between one or more optical components of a third optical component group using a position-holding-and-fixing means, and
securely fixing the one or more optical components to the position-holding-and-fixing means as a second building block including applying a UV curable epoxy and UV curing the epoxy at room temperature.

5. The method of claim 4 wherein:
forming the first and second building blocks is simultaneously carried out as two independent operations.

6. The method of claim 4 further comprising:
aligning and adjusting a relative position between said first and second building blocks using and securely attaching the first and second building blocks together including applying the UV curable epoxy on an interfacing surface between the first and second building block and then UV curing the epoxy at room temperature.

7. The method of claim 4 further comprising:
aligning and adjusting a relative position between one or more optical components of a fourth optical component group using a second position-holding-and-fixing means; and
securely fixing one or more optical components to the second position-holding-and-fixing means as a third building block including applying a UV curable epoxy and UV curing the epoxy at room temperature.

8. The method of claim 7 wherein:
forming the first, second, and third building blocks is simultaneously carried out as three independent steps.

9. The method of claim 7 further comprising:
aligning and adjusting a relative position between the first and second building blocks and between the first and third building blocks and securely attaching the first building block and the second building block together including applying the room-temperature UV curable epoxy on an interfacing surface between the first and second building blocks and securely attaching the first building block and the third building block together including applying the room temperature UV curable epoxy on an interfacing surface between the first and third building blocks then UV curing said epoxy at room temperature.

10. The optical device of claim 7 wherein:
a relative position between the first and second building blocks and between the first and third building blocks are aligned with relative positions adjusted and securely attached together with a UV curable epoxy deposited and UV cured at room temperature on an interfacing surface between the first and second building blocks and between the first and third building blocks.

11. An optical device having at least a first and a second optical component group comprising:
a first position-holding-and-fixing means securely attached to the first and second optical component groups as a first building block, where the first component group includes one or more optical components positioned substantially within a first extension tube, the one or more optical components being coupled to an interior surface of the first extension tube, and wherein the first and second optical component groups are aligned and position adjusted in the position-holding-and-fixing means, where aligning the relative position of the first and second optical component groups includes aligning a dihedral angle between the first and second optical component groups including rotating at least one of the optical component groups relative to the other optical component group.

12. The optical device of claim 11 wherein:
the first position-holding-and-fixing means further comprising the second extension tube to hold the first and second optical component groups.

13. The optical device of claim 11, further comprising fixing the first component group within a second extension tube and securely attaching the first component group within the second extension tube using a UV curable epoxy UV cured at room temperature.

14. The optical device of claim 11 further comprising:
a second building block, including a first position-holding-and-fixing means securely attached to one or more optical components of a third optical component group wherein the one or more optical components of the third optical component group are aligned and position adjusted in the position-holding-and-fixing means and securely attached thereto by a UV curable epoxy UV cured at room temperature.

15. The optical device of claim 14 wherein:
the first and second building blocks are simultaneously manufactured as two independent building blocks.

16. The optical device of claim 14 wherein:
said first and second building blocks are aligned with relative position adjusted and securely attached together using the UV curable epoxy deposited and then UV cured on an interfacing surface between the first and second building blocks.

17. The optical device of claim 14 further comprising:
a third building block including one or more optical components of a fourth optical component group aligned with a relative position adjusted in a second position-holding-and-fixing means and securely fixed thereto using an UV curable epoxy.

18. The optical device of claim 17 wherein:
the first, second and third building blocks are simultaneously manufactured as three independent building blocks.

19. A method for fabricating an optical device using an athermal platform comprising:
positioning one or more first optical components forming a first optical unit, the positioning including positioning the one or more first optical components substantially within a first extension tube, the one or more optical components being coupled to an interior surface of the first extension tube;
positioning one or more second optical components forming a second optical unit the positioning including positioning the one or more second optical components substantially within a second extension tube; and
forming a first building block including:
positioning the first optical unit and the second optical unit in an third extension tube, including adjusting the relative position between the first and second optical units within the third extension tube including aligning a dihedral angle between the first and the second optical units including rotating at least one of the optical units relative to the other optical unit, and securely fixing the first and second optical units to the third extension tube.

20. The method of claim 19 wherein the first and second optical units are securely fixed to the third extension tube using a UV curable epoxy.

21. A method for fabricating an optical device having at least a first and a second optical component group comprising:

aligning and adjusting a relative position between two optical component groups, where a first component group includes one or more optical components positioned substantially within a first extension tube, and securely fixing the two optical component groups including fixing the first component group within a second extension tube as a first building block and where the aligning the relative position between two optical component groups includes aligning a dihedral angle between the two optical component groups including rotating at least one of the two optical component groups relative to an other of the two optical component groups.

* * * * *